Figure 1:
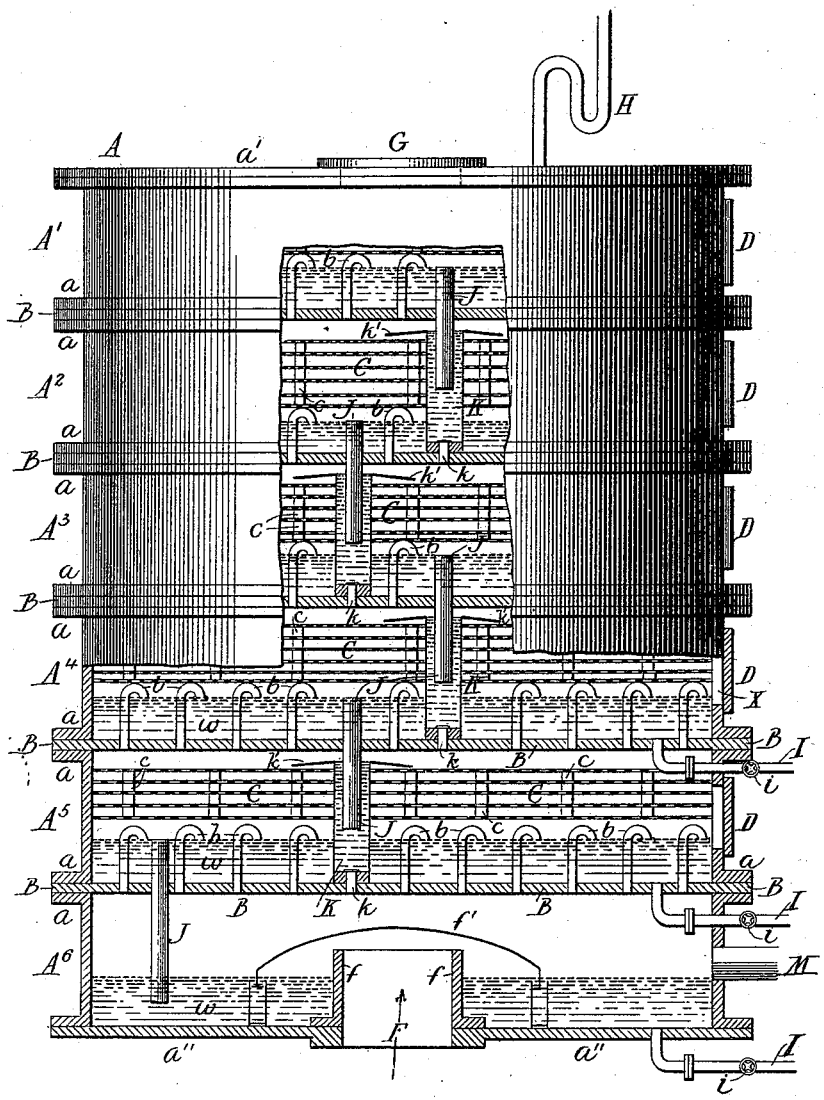

(No Model.) 2 Sheets—Sheet 1.

J. H. FITZGERALD.
APPARATUS FOR WASHING AND SCRUBBING GAS.

No. 493,156. Patented Mar. 7, 1893.

Witnesses
Will T. Norton
M. A. M. Fraysser

Inventor
John H. Fitzgerald
By E. B. Clark
Attorney (No Model.) 2 Sheets—Sheet 2.

J. H. FITZGERALD.
APPARATUS FOR WASHING AND SCRUBBING GAS.

No. 493,156. Patented Mar. 7, 1893.

Witnesses
Will T. Norton
M. A. M. Frayser

Inventor
John H. Fitzgerald
By E. B. Clark
Attorney

UNITED STATES PATENT OFFICE.

JOHN H. FITZGERALD, OF HOUSTON, TEXAS.

APPARATUS FOR WASHING AND SCRUBBING GAS.

SPECIFICATION forming part of Letters Patent No. 493,156, dated March 7, 1893.

Application filed November 26, 1892. Serial No. 453,217. (No model.)

*To all whom it may concern:*

Be it known that I, JOHN H. FITZGERALD, a citizen of the United States, residing at Houston, in the county of Harris and State of Texas, have invented certain new and useful Improvements in Apparatus for Washing and Scrubbing Gas; and I do hereby declare the following to be a full, clear, and exact description of the invention, such as will enable others skilled in the art to which it appertains to make and use the same.

This invention relates to a "washer-scrubber" adapted for washing and scrubbing gas to cleanse it of tarry matter, ammonia, sulphureted hydrogen, carbonic acid and other impurities.

The object of the invention is to provide for repeatedly dividing the gas into numerous fine streams and subjecting such streams first to the washing liquor and then to suitably wetted scrubbing surfaces in the nature of perforated or reticulated plates or screens, so as to effectively remove the contained impurities in a comparatively inexpensive apparatus which may be operated without the use of power gearing.

Another object is to provide for distributing the washing liquor over the surface of the perforated plates or screens which constitute the scrubbing surfaces, successively from one chamber or compartment of a column-washer-scrubber to another, so that the gas in passing up through the column is subjected to a great number and extent of moist scrubbing surfaces.

In carrying out my invention, I provide the horizontal partition plates of the different sections or compartments of a column scrubber with numerous return-bend pipes, having perforated or slotted distributing heads, which dip a short distance into the liquid and serve for uniformily distributing the gas in fine streams throughout the whole area of each section or compartment; and also provide in each compartment a series of perforated plates or screens above the discharging pipes, so that the gas on issuing in fine streams through the purifying liquid passes thence in contact with the wet scrubbing surfaces of such screens, whereby, it is most effectively cleansed from its various impurities. The transfer or overflow pipes for conducting liquid from one chamber or compartment to another, dip at their lower ends into cups which rise nearly to the top of the chamber and are provided at their tops with wide flanges for distributing the over-flow liquid over the top surfaces of the perforated plates or screens, thereby keeping them wetted.

The matter constituting my invention will be defined in the claims.

I will now more particularly describe the construction and arrangement of my apparatus by reference to the accompanying drawings, in which,—

Figure 2:
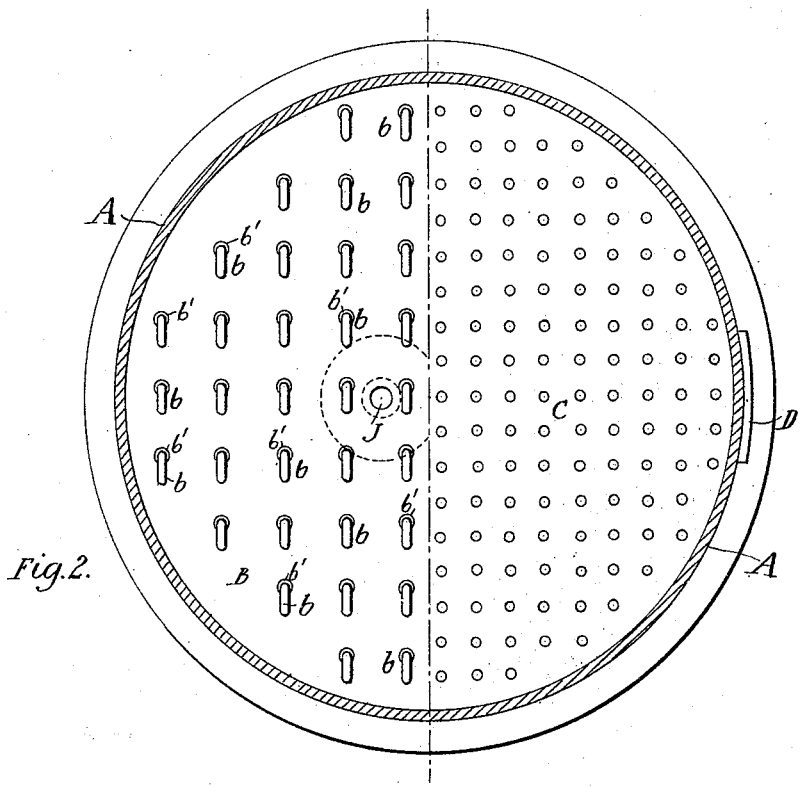
Figure 3:
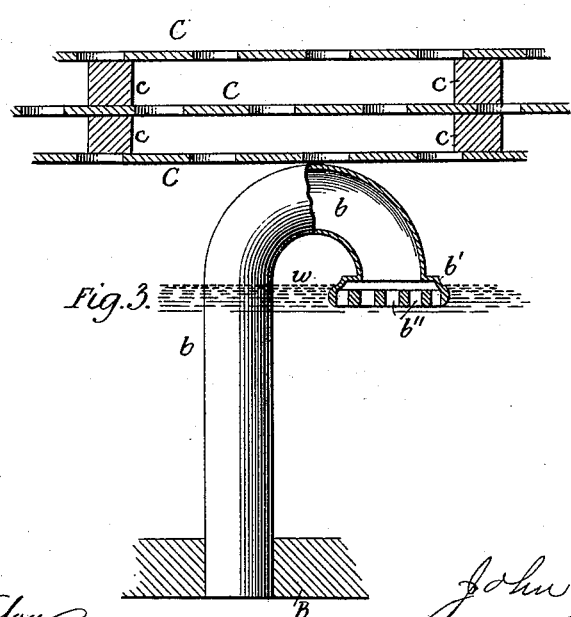

Figure 1 represents a side view of the washer-scrubber partly in elevation and partly in vertical section showing the internal construction and arrangement of the compartments and their washing and scrubbing devices. Fig. 2 shows a horizontal section taken on different horizontal planes showing the return-bend pipes on one side and the perforated plates on the other side. Fig. 3 represents, on enlarged scale, a sectional detail view of return-bend pipes and their perforated heads and perforated plates above such pipes.

My gas washing and scrubbing column, A, is preferably composed of a number of superposed sections, as $A'$, $A^2$, $A^3$, &c. to $A^6$, or any other desired number of sections and the sections may be constructed of cast or wrought iron, or other metal, and are separated one from the other by horizontal partition plates B, which are made the full diameter of the flanges $a$ of the sections, so as to be held in place by the bolts or rivets used in connecting the flanges together. The partition plates B, are provided with numerous holes throughout their entire area into which are screwed or otherwise secured the return-bend pipes $b$, which, as clearly shown, are formed with a long and a short portion, the long portion rising from the partition plate and the short portion extending down a short distance from the crown of the pipe. The short portion of the return-bend pipes is provided with a perforated or slotted head $b'$, forming numerous perforations $b''$, at its under surface, and such perforated head dips a short distance into the body of liquid $w$, resting upon each partition plate B. The partition plates, B, between the sections A', A², A³, &c. divide the column into chambers or compartments, each of which is fitted with washing and scrubbing devices, as shown and the top of the column is closed by a head a', and the bottom by a plate a''. Above the return-bend pipes b, in each chamber are placed a series of perforated plates or screens, C, which may be formed of metal or wood, or other suitable material and which are separated one from another by distance strips or rings c, the bottom plate of the series resting upon the tops of the return-bend pipes, as shown. The plates are preferably so arranged that a solid portion of an upper plate will be placed above the perforations of the adjacent lower plate throughout the series, in order to cause the gas to take a more tortuous or zigzag passage and thus be brought in contact with a greater extent of scrubbing surface. The plates C, are preferably made in strips or sections, which may be conveniently inserted through the man hole openings X, in the wall of the column or of each section thereof.

The water or other washing liquid is transferred from one chamber to another by means of the overflow pipes J, and cups K. The seal cups K, are secured at their bottoms to the plates B, by means of stud bolts k, and such cups rise nearly to the top of each chamber, where their upper ends are provided with a broad downwardly inclined flange k', which projects over the upper perforated plate C, as clearly shown in Fig. 1.

The transfer or over-flow pipe J, is inserted in a suitable opening in each partition plate and rises in each chamber to the proper height for maintaining a body of liquid in each chamber at the proper height for slightly sealing the perforated heads b', of the return-bend pipes, as shown in Fig. 3, and also extends down into the seal cup of the chamber below, so that gas cannot escape through it.

The gas inlet opening F, of the bottom plate a'', is provided with a short upwardly extending pipe f, which is preferably covered by a floating hood or cap, f', for better distributing the inflowing gas. The upper plate, a', of the column is provided with the usual gas outlet G, and also with a water supply pipe H. A drain pipe I, having a valve i, preferably leads from each chamber through the partition plate B, for drawing off the concentrated ammoniacal liquid. Each section of the column A', A², &c. is provided with a man hole X, closed by a lid or door D. The lower section or chamber of the column, is provided with an outlet pipe M, which in practice, leads through a trap, or seal to a well or cistern for receiving the liquor.

Although my washer-scrubber is illustrated in a cylindrical form, I wish it understood that I do not confine myself to such shape, and it may be made square, or rectangular, or of any other desired form.

Before securing the sections together, the inner surfaces of the flanges a, and also the surfaces of the partitions B, where it is to be secured between the flanges, are planed, so that perfectly tight joints may be made when the parts are properly riveted or bolted together. The short flange-pipe f, rising from the bottom plate a'', prevents liquor from flowing into the gas inlet pipe and also maintains a sufficient body of liquid on the bottom plate to seal the transfer pipe J, leading from the chamber next above.

The operation of my apparatus is very simple and will require but little attention in practice. Pure water is preferably admitted through the supply pipe H, at the top of the column into the first chamber, where it removes the last impurities from the partially purified gas which has passed up through the different compartments of the column, and the excess of water as it accumulates in the top compartment flows thence through the transfer pipe J in the seal cup K of the next lower compartment from which it is forced upward through the cup until it flows over the top thereof and out over the broad flange k', on to the perforated plate C, from which it gradually trickles down through the perforations into the body of liquid contained in the compartment, thereby keeping the surfaces of the plates wet and materially aiding in removing impurities from the upwardly passing streams of gas. The purifying liquid flows from chamber to chamber down through the series in the manner above explained and becomes more and more concentrated and especially rich in ammonia as it progresses toward the bottom compartment of the column, and the concentrated liquor is finally passed off through pipe M through the usual seal pot to a liquor tank, not here shown. By regulating the amount of water admitted at the top of the column a very strong liquor may be obtained.

Having described my invention, what I claim, and desire to secure by Letters Patent, is—

1. A washer-scrubber divided by horizontal partitions into compartments, one above another, each of said partitions being provided with numerous return-bend pipes, the short portions of which have perforated heads arranged to dip into a body of liquor supported on the partition plate, substantially as described.

2. In a washer-scrubber, the horizontal partition plates separating it into compartments one above another and each provided with numerous return-bend pipes having perforated heads dipping into the liquor as described, in combination with a series of perforated plates or screens arranged in the compartments above said return-bend pipes, substantially as described.

3. In a washer-scrubber, a series of superposed compartments or chambers containing perforated plates, in combination with liquid transfer or overflow devices, consisting of a pipe and a seal cup having at its upper end a distributing flange extending over the perforated plates, and means for passing gas from chamber to chamber through said plates, substantially as described.

4. In a washer-scrubber, the horizontal partition plates provided with return-bend pipes having perforated heads, in combination with perforated plates above said pipes and liquid transfer pipes provided with means for distributing liquid over the tops of the perforated plates, substantially as described.

In testimony whereof I affix my signature in presence of two witnesses.

JOHN H. FITZGERALD.

Witnesses:
   THOS. D. KEHOE,
   GEORGE COLES.